(12) United States Patent
Izawa et al.

(10) Patent No.: US 6,651,767 B2
(45) Date of Patent: Nov. 25, 2003

(54) CONTAINER BOX STRUCTURE IN TWO-WHEELED MOTOR VEHICLE

(75) Inventors: Kenji Izawa, Saitama (JP); Kengo Yano, Saitama (JP); Yoichi Inayama, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/947,451

(22) Filed: Sep. 7, 2001

(65) Prior Publication Data

US 2002/0053584 A1 May 9, 2002

(30) Foreign Application Priority Data

Sep. 8, 2000 (JP) ........................................ 2000-274042

(51) Int. Cl.[7] ............................................... B62D 61/02
(52) U.S. Cl. ....................................................... 180/219
(58) Field of Search ............................... 180/219, 89.11; 224/413, 429, 433

(56) References Cited

U.S. PATENT DOCUMENTS

| | | | | |
|---|---|---|---|---|
| 5,433,286 A | * | 7/1995 | Kumamaru et al. | 180/219 |
| 6,073,719 A | | 6/2000 | Ohmika et al. | 180/219 |
| 6,336,579 B1 | * | 1/2002 | Sako | 180/219 |
| 6,349,785 B1 | * | 2/2002 | Ohmika et al. | 180/219 |
| 6,357,542 B1 | * | 3/2002 | Sako | 180/219 |

FOREIGN PATENT DOCUMENTS

| | | |
|---|---|---|
| EP | 0 323 908 A2 | 7/1989 |
| EP | 0 952 076 A2 | 10/1999 |
| EP | 1 125 835 A2 | 8/2001 |
| GB | 2 210 340 A | 6/1989 |
| JP | 7-46617 | 10/1995 |
| JP | 10-236357 | 9/1998 |
| JP | 11129969 | 5/1999 |

* cited by examiner

*Primary Examiner*—Lesley D. Morris
*Assistant Examiner*—L. Lum
(74) *Attorney, Agent, or Firm*—Birch, Stewart, Kolasch & Birch, LLP (57) ABSTRACT

Two front and rear helmets are to be contained in a container box without increasing the height of a seat. In a two-wheeled motor vehicle, a container box extending in the longitudinal direction of a vehicle body is disposed above a rear wheel, and a seat is disposed above the container box. A bottom plate of the container box is formed in an approximately inverse-V shape when viewed from the side. The container box includes a forward downwardly slanting face and a rearward downwardly slanting face. Two helmets Hf and Hr can be received in front and rear positions within the container box, by placing them on the forward downwardly slanting face and a rearward downwardly slanting, respectively.

20 Claims, 8 Drawing Sheets

CONTAINER BOX STRUCTURE IN TWO-WHEELED MOTOR VEHICLE

BACKGROUND OF THE INVENTION

1. Field of the Invention

The present invention relates to a container box structure in a two-wheeled motor vehicle.

2. Description of Background Art

In certain types of two-wheeled motor vehicles, a container box is disposed at a rear portion of a vehicle body. For example, scooter type two-wheeled motor vehicles include a container box disposed at a rear portion of the vehicle body thereof.

A two-wheeled motor vehicles of this type is known from, for example, Japanese Utility Model Publication No. Hei 7-46617 (hereinafter referred to as "background art (1)") entitled "TWO-WHEELED MOTOR VEHICLE," and Japanese Patent Laid-open No. Hei 10-236357 entitled "SCOOTER TYPE TWO- AND THREE-WHEELED MOTOR VEHICLES" in ("background art (2)" hereinafter).

In the background art (1), as illustrated in FIG. 2 of this publication, a front container box 12 (the reference numeral is quoted from the above publication, as is also the case with the following) is disposed below a seat 21. A rear container box 22 is disposed behind the seat 21 and above a rear wheel 20. Furthermore, helmets H are received within the front and rear container boxes 12, 22, respectively. Thus, the front and rear container boxes 12, 22 are separated from each other in the front and rear of the vehicle.

In the background art (2), as shown in FIGS. 1 and 2 of this publication, an elongated container box 41 having a length equal to the overall length of a two-person seat 17 is disposed below the seat 17. A rear wheel 11 is disposed below a rear half portion of the container box 41. Furthermore, a helmet is received within the rear half portion of the container box 41.

In the background art (2) referred to above, as the case may be, the front and rear container boxes 12, 22 are gathered into a single elongated container box to meet requirements in design for the two-wheeled motor vehicle concerned. Two helmets H are accommodated within the container box and arranged in front and rear directions. The container box which contains two helmets H is large in capacity. Accordingly, if the container box is merely disposed above the rear wheel 20 and below the seat 21, it is inevitably required that a vertical position of the seat 21 be raised to ensure sufficient space for installation. In view of the distance between the seat 21 and the foot positioning of the vehicle, it is impossible to simply raise or lower the seat 21.

This is also true of the prior art (1) described above.

SUMMARY OF THE INVENTION

It is an object of the present invention to provide a technique which permits two helmets to be contained in a container box without raising a vertical position of the seat of the vehicle.

For achieving the above-mentioned object, according to a first aspect of the present invention, a two-wheeled motor vehicle has a container box extending longitudinally of the vehicle body. The container box is disposed above the rear wheel of the vehicle and the seat is disposed on the container box. The container box structure includes a bottom plate constructed from a forward downwardlyly slantinging face and a rearward downwardlyly slantinging face. Therefore, the bottom plate is formed in an approximately inverse V-shape in side view. Accordingly, it is possible to located helmets on both of the forward downwardlyly slantinging face and the rearward downwardlyly slantinging face, respectively.

The bottom plate of the container box is approximately inverse-V shaped when viewed from the side. Thus, the container box can be disposed so that the bottom plate covers an upper portion of the rear wheel. Furthermore, the container box can be mounted in a lower position than the background art. In addition, since the bottom plate is provided with forward and rearward downwardlyly slantinging faces, the capacity of the container box substantially increases when compared to the background art. Furthermore, two helmets can be accommodate in front and rear positions within the container box by placing them on the forward and rearward downwardlyly slantinging faces, respectively.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Embodiments of the present invention now be described with reference to the accompanying drawings. In the following description, "front," "rear," "left," "right," "upper," and "lower" represent directions viewed from the perspective of the vehicle rider. Fr, Rr, L, and R stand for front, rear, left, and right sides, respectively. Furthermore, the drawings should be viewed in the direction in which the reference numerals are oriented.

First, with reference to FIGS. 1 to 3, a description will now be given concerning a container box structure according to the first embodiment of the present invention.

Figure 1:
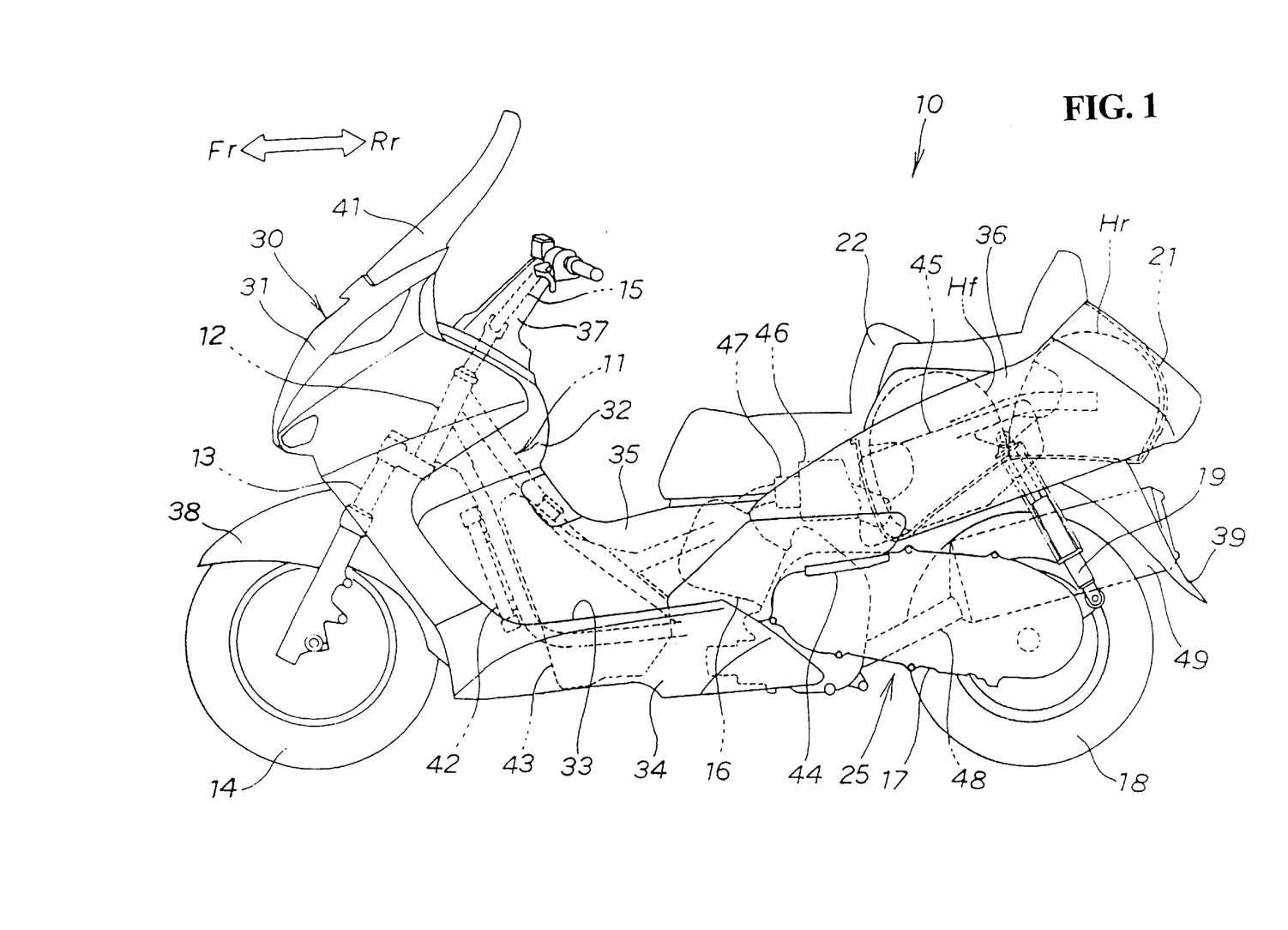
FIG. 1 is a left side view of a two-wheeled motor vehicle according to a first embodiment of the present invention.

FIG. 1 is a left side view of a two-wheeled motor vehicle according to the first embodiment of the present invention.

The two-wheeled motor vehicle, indicated at 10, is a scooter type two-wheeled motor vehicle mainly composed of a body frame 11, a front fork 13 attached to a head pipe 12 of the body frame 11, a front wheel 14 secured to the front fork 13 and a handlebar 15 connected to the front fork 13. Furthermore, an engine 16 is mounted to a rear portion of the body frame 11, a power transfer mechanism 17 is secured to the engine 16 in a vertically swingable manner and a rear wheel 18 is secured to the power transfer mechanism 17. In addition, rear cushion units 19 suspend a rear end portion of the power transfer mechanism 17 from the body frame 11. Referring to FIGS. 1 and 3, a helmet container box 21 is attached to a rear upper portion of the body frame 11 and a seat 22 is mounted above the helmet container boxy 21 so that it can be opened and closed. The seat 22 is a double passenger seat.

The helmet container box 21 (hereinafter referred to simply as "container box 21") is an elongated resin box disposed above the rear wheel 18 and extending longitudinally of the vehicle body. The container box 21 permits helmets Hf and Hr to be contained therein in front and rear positions.

In the two-wheeled motor vehicle 10, the body frame 11 is covered with a body cover 30. The body cover 30 includes a front cover 31 which covers a front portion of the head pipe 12, an inner cover 32 which covers a rear portion of the front cover 31, right and left floor steps 33 of a low floor type for the vehicle rider to put his or her feet on, right and left floor skirts 34 extending downwardly from an outer edge of the floor step 33, a center cover 35 extending backward from the inner cover 32 and which covers a longitudinally central portion of the body frame 11, and a rear cover 36 extending backward from the center cover 35 and which covers the rear portion of the body frame 11.

In the figure, the numeral 37 denotes a handlebar cover, numeral 38 denotes a front fender, numeral 39 denotes a rear fender, 41 a windscreen, 42 a radiator for cooling the engine, 43 a fuel tank, 44 a passenger step, 45 an air cleaner, 46 an air chamber, 47 a throttle valve, 48 an exhaust pipe for the engine, and 49 a muffler.

Figure 2:
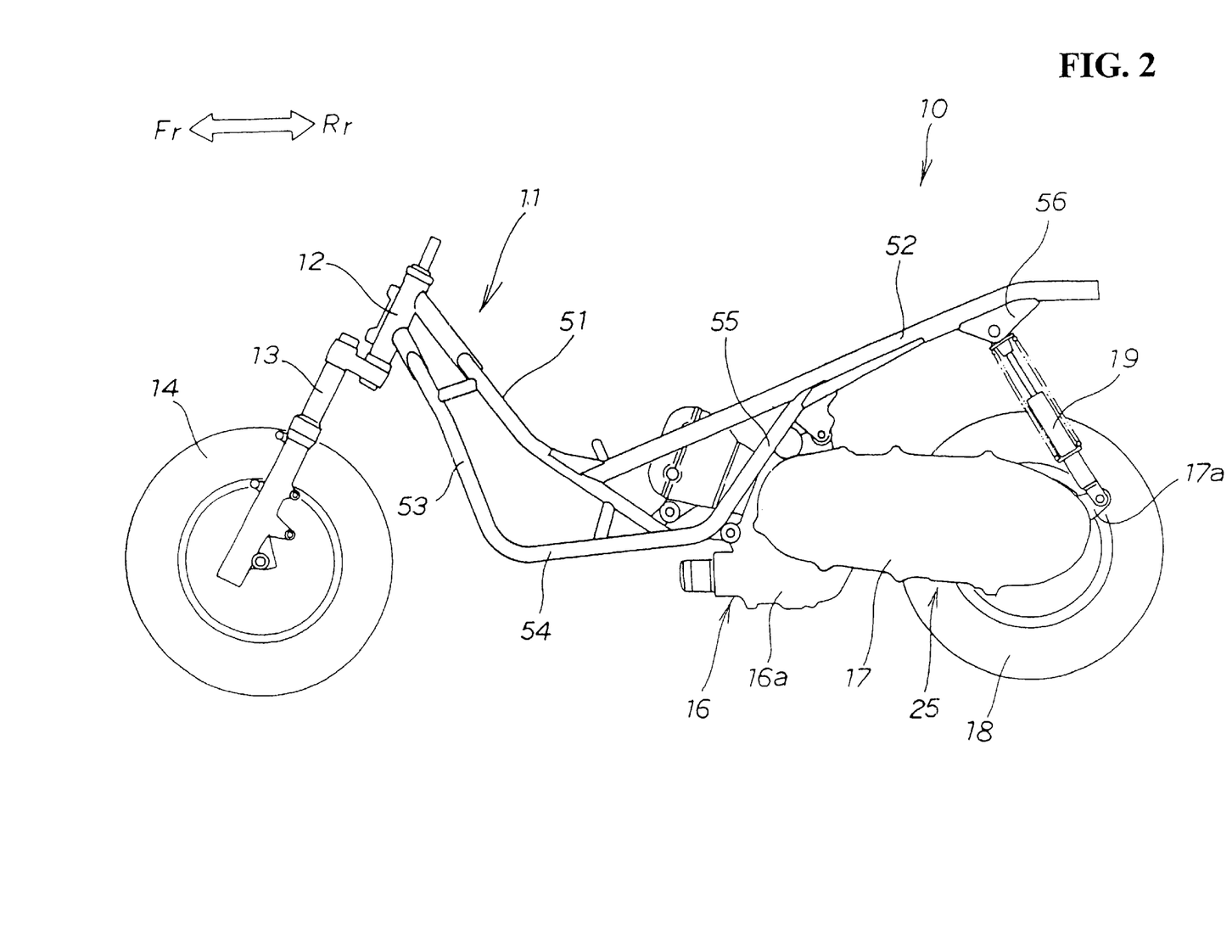
FIG. 2 is a left side view of a body frame according to the first embodiment of the present invention.

FIG. 2 is a left side view of the body frame of the first embodiment of the present invention.

The body frame 11 is a double cradle type frame. The frame includes a pair of main pipes 51 which extend rearward downwardly from the head pipe 12, a pair of rear frames 52 which extend rearward upwardly from longitudinally intermediate positions of the main pipes 51, a pair of down-pipes 53 extend rearward downwardly from the head pipe 12 below the main pipes 51 and a pair of lower pipes 54 extend rearward from lower ends of the down-pipes 53. Lower ends of the main pipes 51 are connected to longitudinally intermediate positions of the lower pipes 54. Upper pipes 55 extend rearward upwardly from rear ends of the lower pipes 54. Furthermore, rear ends of the upper pipes 55 are connected to longitudinally intermediate positions of the rear frames 52.

The rear frames 52 extend longitudinally above the rear wheel 18 and are provided at rear end portions thereof with brackets 56 which connect upper portions of the right and left rear cushion units 19 (only the left one is shown in the figure).

The power transfer mechanism 17 is connected to a crank case 16a of the engine 16 in a vertically swingable manner. The rear wheel 18 is roatatably secured to a rear portion of the power transfer mechanism. Thus, the power transfer mechanism 17 plays the role of a rear fork (swing arm) 25. Furthermore, the power transfer mechanism 17 is provided at the rear end thereof with brackets 17a for connecting lower portions of the rear cushion units 19 thereto.

Figure 3:
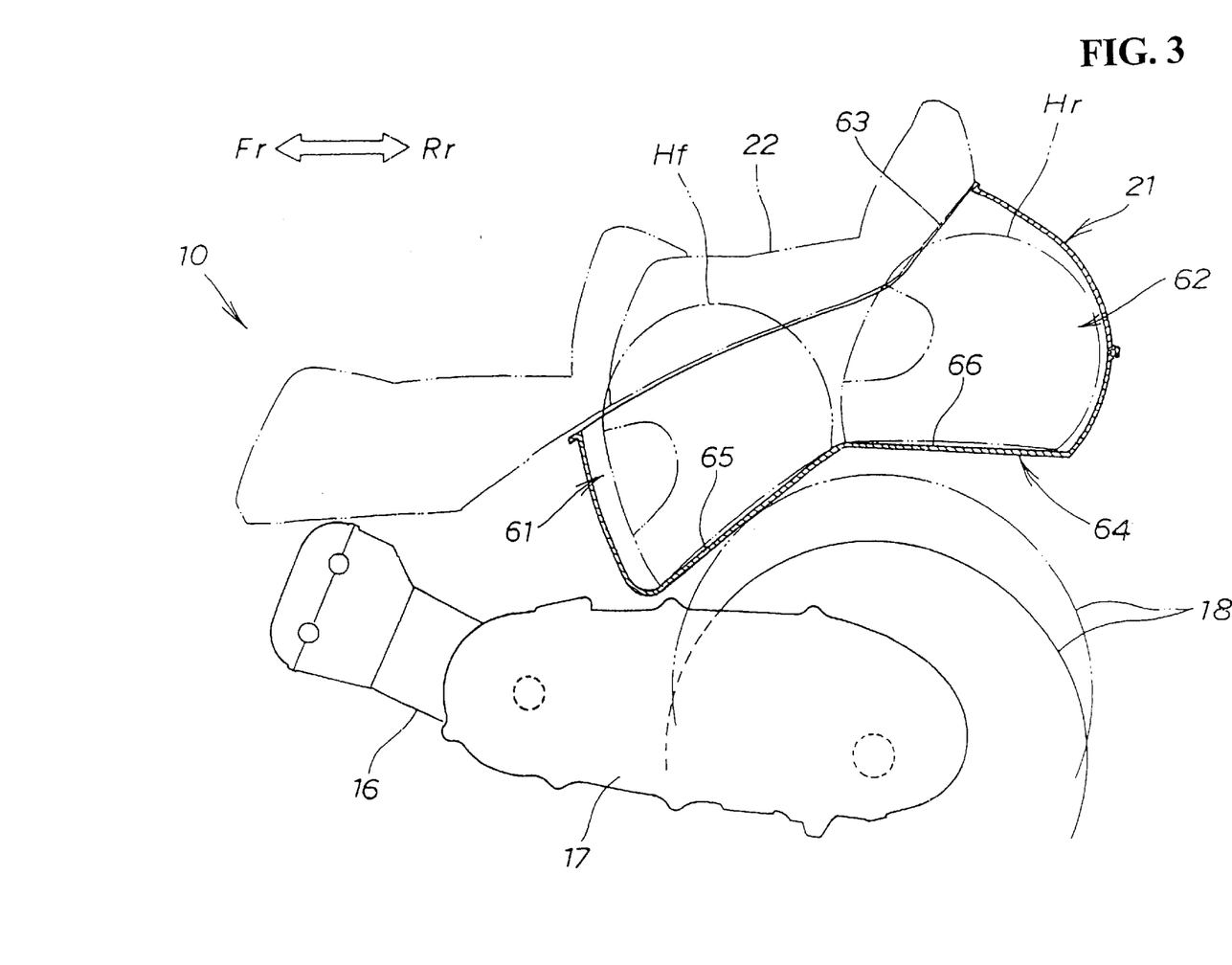
FIG. 3 is a sectional view of a helmet container box according to the first embodiment of the present invention in a left side direction.

FIG. 3 is a sectional view of the container box 21 of the first embodiment when viewed from the left side.

The container box 21 is an upwardly opening type box integrally formed with a front container portion 61 for receiving the front helmet Hf and a rear container portion 62 for receiving the rear helmet Hr. An opening 63 of the container box 21 is opened and closed with movement of the seat 22. More specifically, a front lower portion of the seat 22 is pivotably mounted to the body frame 11 (vehicle body) shown in FIG. 2 and the upper opening 63 of the container box 21 is opened by lifting a rear portion of the seat 22. The length in the longitudinal direction of the container box 21 is approximately equal to the outside diameter of the rear wheel 18 and is a little larger than the length of the rear seat portion of the seat 22. The container box 21 is positioned so as to be substantially within the range from the front to the rear end of the rear wheel 18 when the two-wheeled motor vehicle 10 is viewed from the side.

A bottom plate 64 of the container box 21 includes a forward downwardly slanting face 65 as a front half and a rearward downwardly slanting face 66 as a rear half. The slanting faces 65 and 66 form an approximately inverse-V shape when viewed from the side. The forward downwardly slanting face 65 and the rearward downwardly slanting face 66 are flat in shape which generally conforms to the contour of the rear wheel 18 when the rear wheel 18 rises to its maximum extent as shown in an imaginary line. The angle of inclination of the rearward downwardly slanting face 66 is gentler than that of the forward downwardly slanting face 65. The container box 21 is disposed so that an upper portion of the rear wheel 18 is covered with both the forward downwardly slanting face 65 and the rearward downwardly slanting face 66. The helmets Hf and Hr can be received within the front and rear container portions 61, 62 by putting them on the forward downwardly slanting face 65 and the rearward downwardly slanting face 66, respectively.

Referring to FIGS. 4 to 8, the container box structure in a two-wheeled motor vehicle according to the second embodiment of the present invention will now be described. It should be noted that the same elements in the second embodiment that correspond to the same elements in the first embodiment will be identified by the same reference numerals as the first embodiment. Accordingly an explanation thereof will be omitted.

Figure 4:
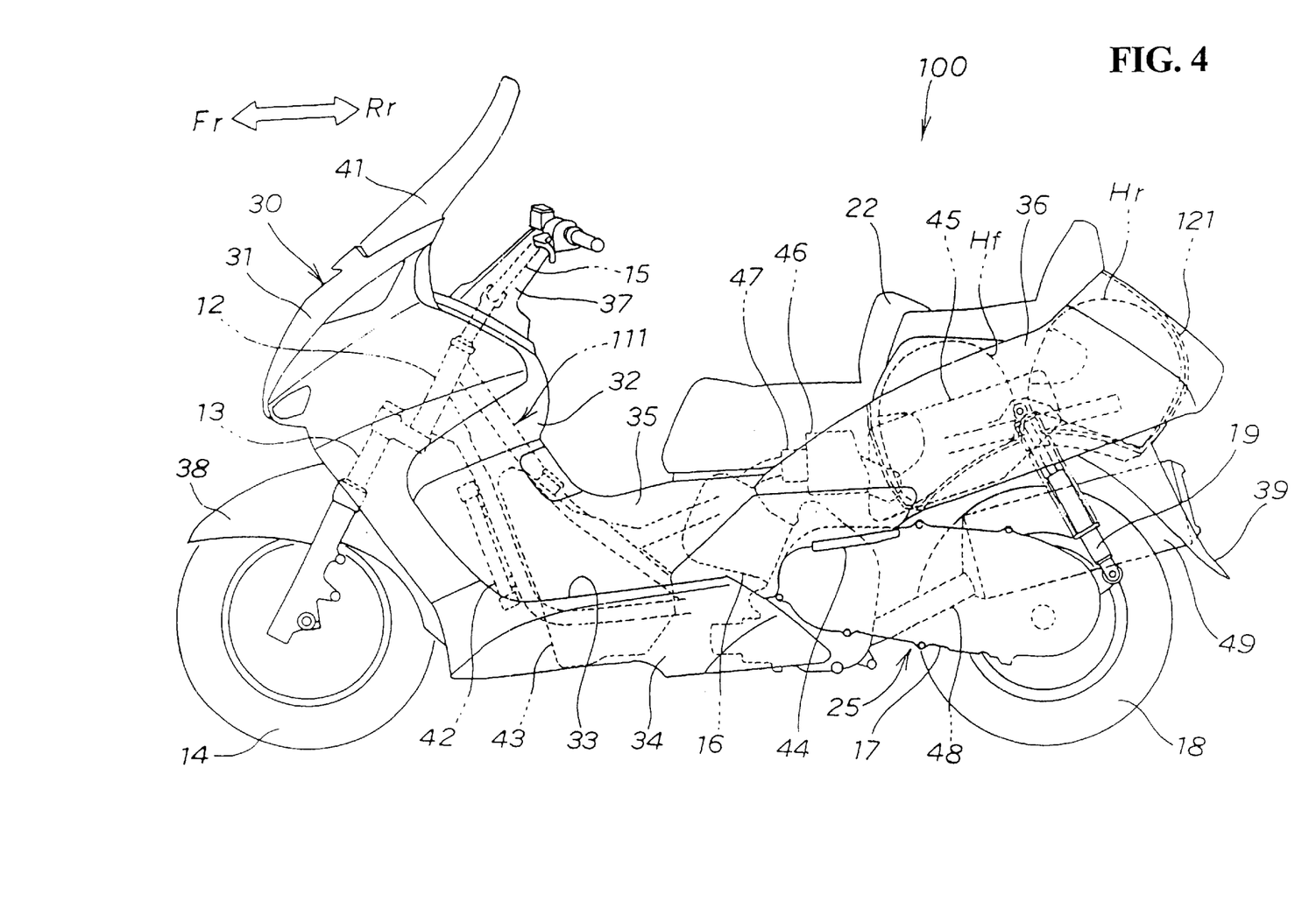
FIG. 4 is a left side view of a two-wheeled motor vehicle according to a second embodiment of the present invention.

FIG. 4 is a left side view of a two-wheeled motor vehicle according to the second embodiment of the present invention.

In the second embodiment, the two-wheeled motor vehicle, indicated at 100, is a scooter type two-wheeled motor vehicle mainly composed of a body frame 111, a front fork 13, a front wheel 14, a handlebar 15, an engine 16, a power transfer mechanism 17, a rear wheel 18, rear cushion units 19, a helmet container box 121, and a seat 22.

The helmet container box 121 (hereinafter referred to simply as "container box 121") is an elongated box disposed above the rear wheel 18 and extending longitudinally of the vehicle body. Helmets Hr and Hr can be received within front and rear portions, respectively, of the container box 121.

Figure 5:
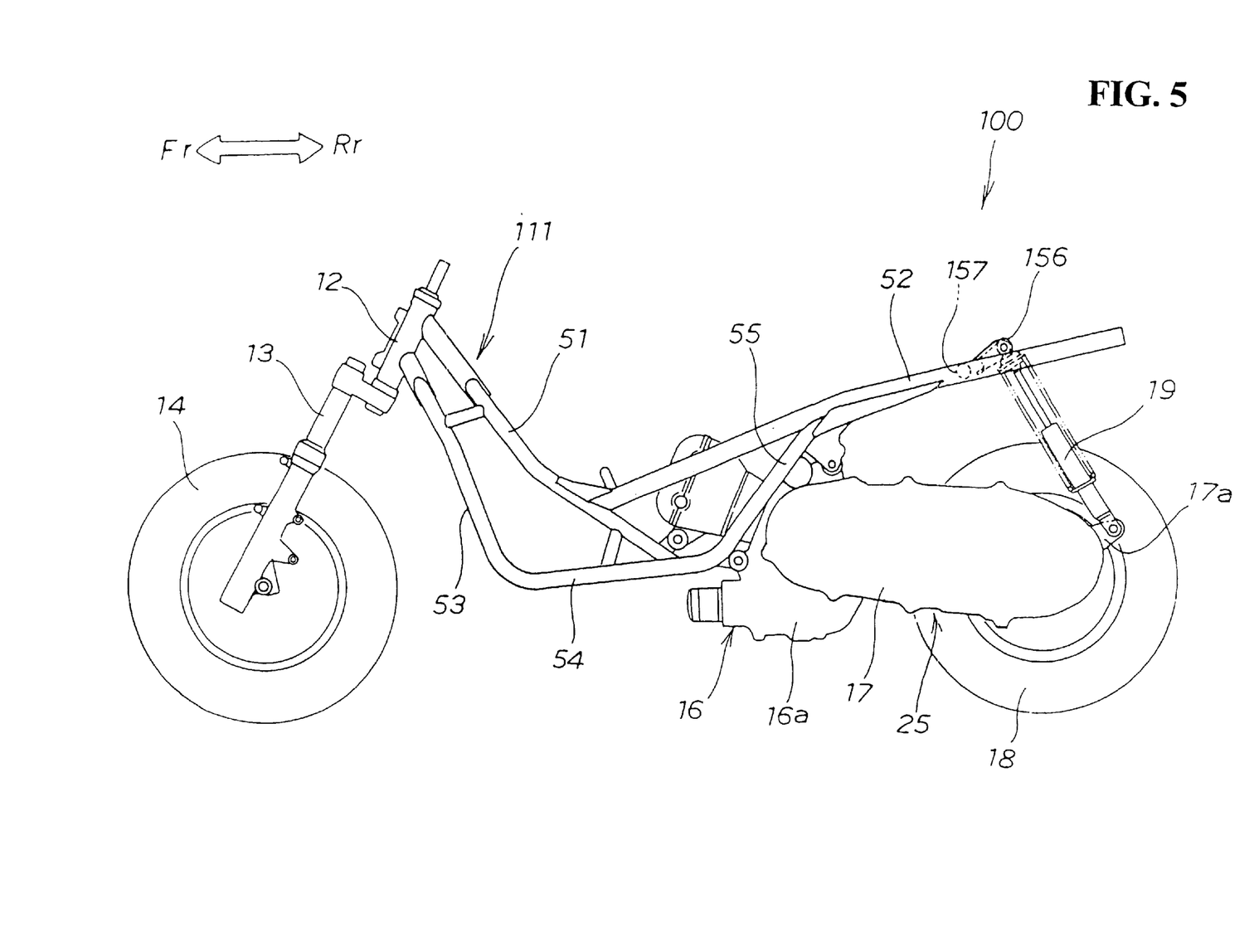
FIG. 5 is a left side view of a body frame according to the second embodiment of the present invention.

FIG. 5 is a left side view of the body frame of the second embodiment of the present invention.

In the body frame 111 of the second embodiment, the shape of brackets 156 provided at rear portions of the rear frames 52 is different from that of the brackets 56 used in the first embodiment shown in FIG. 2. Numeral 157 denotes a cross member. The remaining construction of the body frame 11 of the second embodiment is the same as the body frame 11 of the first embodiment.

Figure 6:
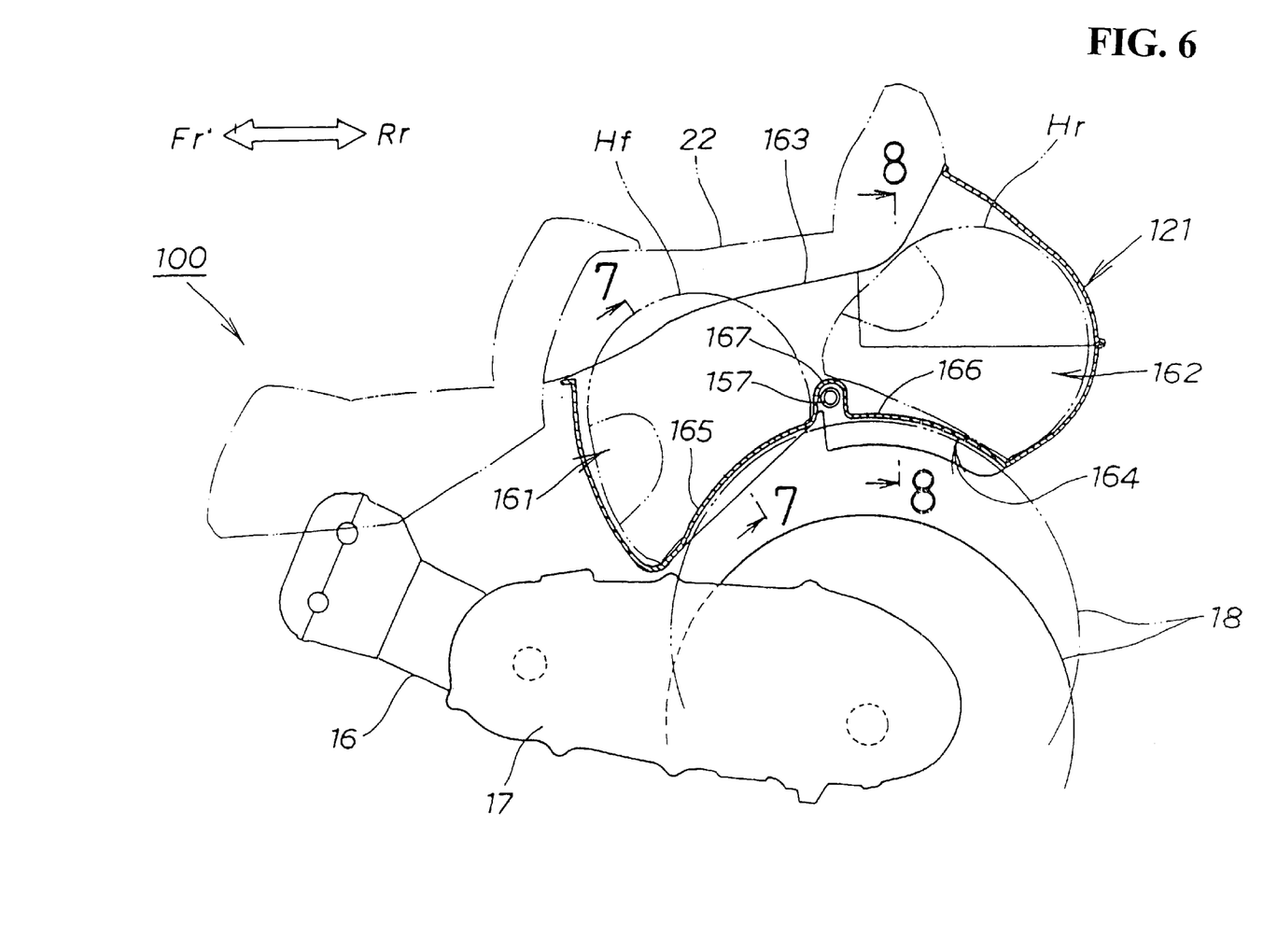
FIG. 6 is a sectional view of a helmet container box according to the second embodiment of the present invention in a left side direction.

FIG. 6 is a sectional view of the container box 121 according to the second embodiment of the present invention when viewed from the left side.

The container box 121 is an upwardly opening type box which is integrally formed with a front container portion 161 for receiving the front helmet Hf therein and a rear container portion 162 for receiving the rear helmet Hr therein. An upper opening 163 of the container box 121 is opened and closed with the seat 22. More specifically, a front lower portion of the seat 22 is pivotably mounted to the body frame 111 (vehicle body) shown in FIG. 5, and the upper opening 163 of the container box 121 is opened by lifting a rear portion of the seat. The length in the longitudinal direction of the container box 121 is approximately equal to the outside diameter of the rear wheel 18 and is a littler larger than the length of the rear seat portion of the seat 22. The container box 121 is positioned so as to be substantially within the range from the front to the rear end of the rear wheel 18 when the two-wheeled motor vehicle 100 is viewed from the side.

A bottom plate 164 of the container box 121 is of a curved shape generally conforming to the contour of the rear wheel 18 when seen sideways. To be more specific, the bottom plate 164 is made up of a forward downwardly slanting face 165 as a front half, a rearward downwardly slanting face 166 as a rear half, and a cover portion 167 located at a longitudinally central position, so as to be formed in an approximately inverse-V shape in side view. The forward downwardly slanting face 165 and the rearward downwardly slanting face 166 are of an arcuate shape which generally conforms to the contour of the rear wheel 18 when the rear wheel rises to its maximum extent as shown by an imaginary line. The angle of inclination of the rearward downwardly slanting face is gentler than that of the forward downwardly slanting face 165.

The container box 121 is disposed so that an upper portion of the rear wheel 18 is covered with both slanting faces 165 and 166. The helmets Hf and Hr can be received within the front and rear container portions 161, 162 by placing them on the slanting faces 165 and 166, respectively.

The cover portion 167 covers the cross member 157.

Figure 7:
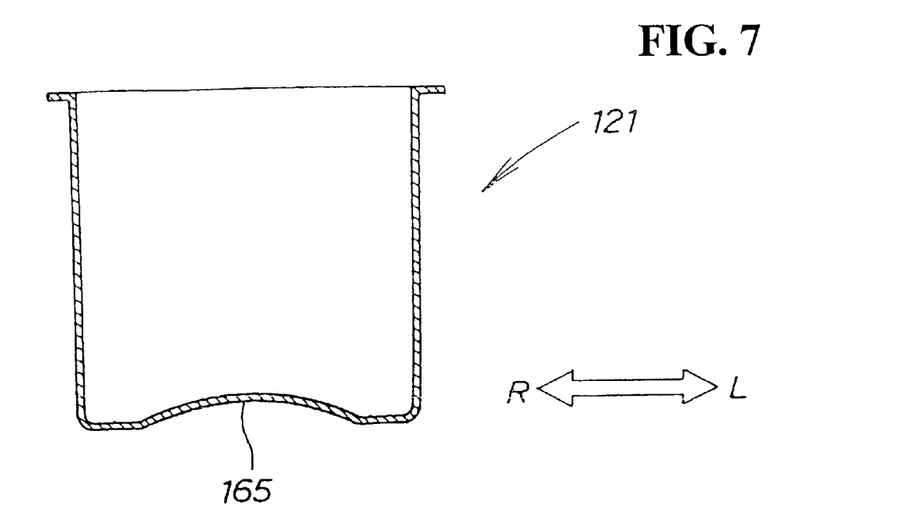
FIG. 7 is a sectional view taken on line 7—7 in FIG. 6.

FIG. 7 is a sectional view taken on line 7—7 in FIG. 6, showing a sectional shape of the forward downwardly slanting face 165.

Figure 8:
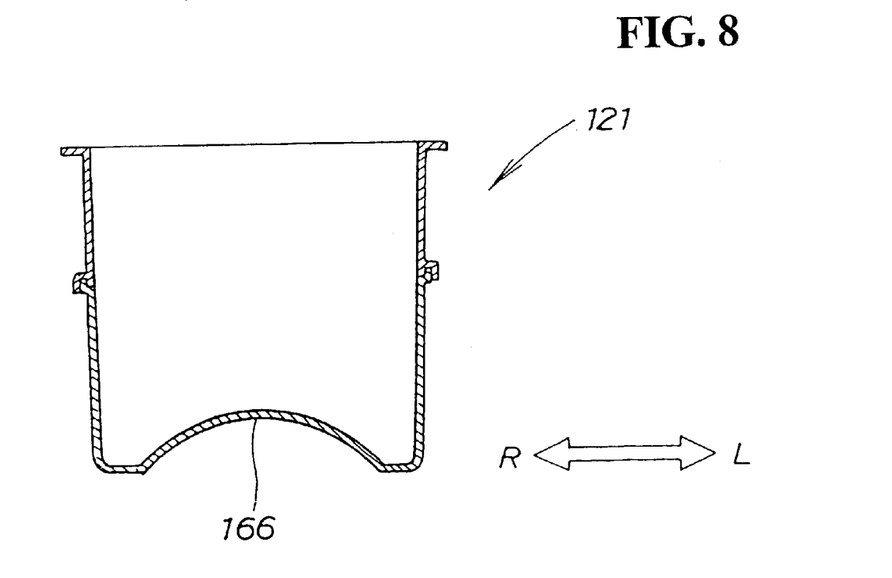
FIG. 8 is a sectional view taken on line 8—8 in FIG. 6.

FIG. 8 is a sectional view taken on line 8—8 in FIG. 6, showing a sectional shape of the rearward downwardly slanting face 166.

FIGS. 9(a) to 9(d) are operational diagrams of container box structures in a two-wheeled motor vehicle.

Figure 9A:
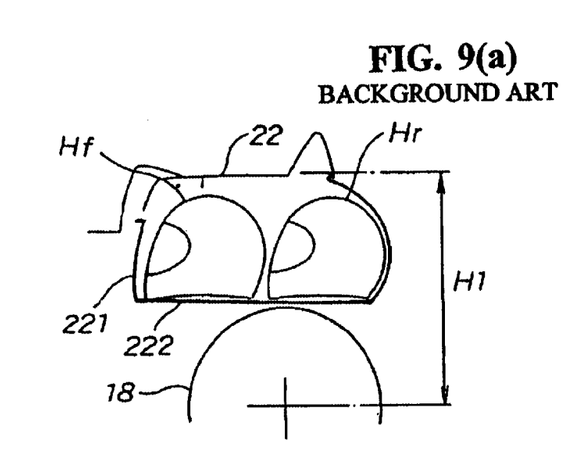
FIGS. 9(a), 9(b), 9(c) and 9(d) are operational diagrams of container box structures in a two-wheeled motor vehicle.

FIG. 9(a) is a first comparative example, showing that an entirety of a bottom plate 222 of a container box 221 is flat and horizontal when viewed from the side. The entirety of the bottom plate 222 is positioned higher than the rear wheel 18. With this structure, the height from the center of the rear wheel 18 up to the seat 22 is Hi, which is relatively large.

Figure 9B:
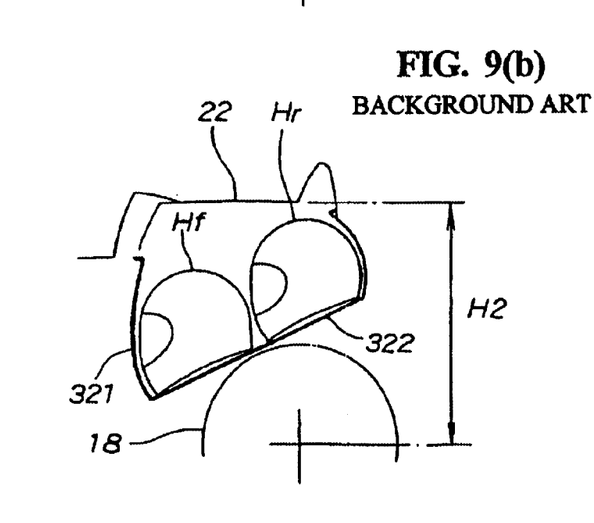

FIG. 9(b) is a second comparative example, showing that the entirety of a bottom plate 322 of a container box 321 is flat and forwardly inclined when viewed from the side. A rear half portion of the bottom plate 322 rises a large amount from the rear wheel 18. With this structure, the height from the center of the rear wheel 18 up to the seat 22 is H2, which is also relatively large.

Figure 9C:
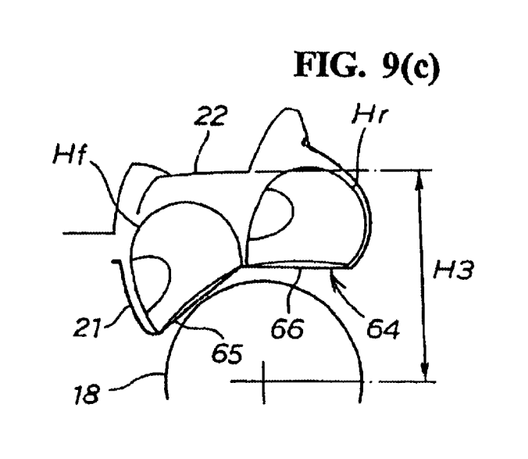

FIG. 9(c) is the first embodiment of the present invention, which corresponds to the container box 21 shown in FIG. 3. The bottom plate 64 of the container box 21 is generally formed in an approximately inverse-V shape when viewed from the side. The container box 21 can be disposed in such a manner that the upper portion of the rear wheel 18 is covered with both forward and rearward downwardly slanting faces 65, 66. The container box 21 can therefore be substantially lowered when compared to the comparative examples. With this structure, the height from the center of the rear wheel 18 up to the seat 22 is H3, which is relatively small.

Furthermore, since the bottom plate 64 includes both forward and rearward downwardly slanting faces 65, 66, the capacity of the container box 21 increases substantially. By placing the helmets Hf and Hr on the forward downwardly slanting face 65 and the rearward downwardly slanting face 66, respectively, both helmets can be easily received within the container box 21 which has large capacity.

Figure 9D:
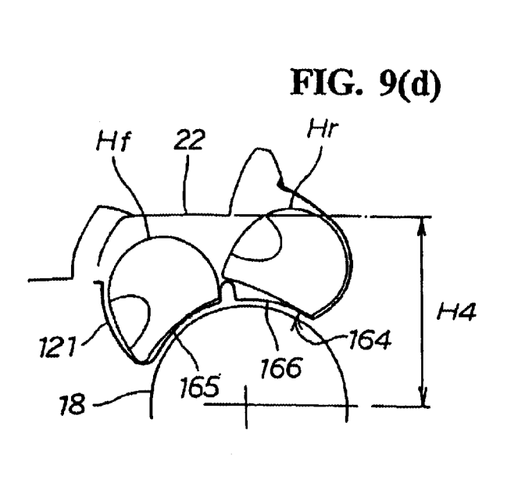

FIG. 9(d) is the second embodiment of the present invention, which corresponds to the container box 121 shown in FIG. 6. The bottom plate 164 of the container box 121 is generally formed in an approximately inverse-V shape when viewed from the side. In addition, the bottom plate 164 is curved in a shape which generally conforms to the contour of the rear wheel 18. This curved shape permits the container box 121 to be lowered to a greater extent than the comparative examples and the first embodiment of the present invention which is illustrated in FIG. 9(c). With this structure, the height from the center of the rear wheel 18 up to the seat 22 is H4, which is much smaller than the previous examples.

Furthermore, since the curved shape generally conforms to the contour of the rear wheel 18, the capacity of the container box 121 increases. By placing the helmets Hf and Hr on the forward downwardly slanting face 165 and the rearward downwardly slanting face 166, respectively, both helmets can be easily received within the container box 121 which has a large capacity.

By forming the bottom plates 64 and 164 of the container boxes 21 and 121 in an approximately inverse-V shape when viewed from the side, as in the first and seond embodiments of the present invention illustrated in FIGS. 9(a) and 9(b) above, respectively, the capacity of each of the container boxes 21 and 121 can be ensured sufficient for receiving therein two helmets Hr and Hr in front and rear positions without increasing the height of the seat 22.

In the above embodiments of the present invention the two-wheeled motor vehicle 10 is not limited to a scooter type two-wheeled motor vehicle.

The above construction of the present invention brings about the following effects.

According to the first and second embodiments of the present invention, the bottom plate of the container box is formed in an approximately inverse-V shape when viewed from the side. The container box includes a forward downwardly slanting face and a rearward downwardly slanting face so that helmets can be placed on the slanting faces, respectively. Therefore, the container box can be disposed in such a manner that the upper portion of the rear wheel is covered with the bottom plate so that the container box can be substantially lowered. In addition, such forward and rearward downwardly slanting faces of the bottom plate permit an increase in capacity of the container box and thus it is possible to ensure a sufficient capacity of the container box for receiving two helmets therein in front and rear positions without increasing the height of the seat.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a two-wheeled motor vehicle, a container box extending longitudinally of a vehicle body is disposed above a rear wheel and a seat is disposed on said container box, said container box comprising:

a bottom plate, an entire width of said bottom plate including a forward downwardly slanting face and a rearward downwardly slanting face, said forward and rearward downwardly slanting faces forming an approximately inverse-V shape when viewed from a side, and wherein said forward and rearward downwardly slanting faces are capable of receiving helmets thereon, respectively.

2. The two-wheeled motor vehicle according to claim 1, wherein each of said forward and rearward downwardly slanting faces is flat across the entire width thereof.

3. The two-wheeled motor vehicle according to claim 1, wherein each of said forward and rearward downwardly slanting faces includes a central portion thereof curved in a longitudinal direction of the two-wheeled motor vehicle to conform to a longitudinal shape of said rear wheel of the two-wheeled motor vehicle.

4. The two-wheeled motor vehicle according to claim 3, wherein each of said forward and rearward downwardly slanting faces includes a central portion thereof curved in a transverse direction of the two-wheeled motor vehicle to conform to a transverse shape of the rear wheel of the two-wheeled motor vehicle.

5. The two-wheeled motor vehicle according to claim 4, wherein said vehicle body includes a cross-member extending in a transverse direction of the two-wheeled motor vehicle, said bottom plate including a curved cover portion located at an apex between said forward and rearward downwardly slanting faces for covering said cross-member.

6. The two-wheeled motor vehicle according to claim 3, wherein said vehicle body includes a cross-member extending in a transverse direction of the two-wheeled motor vehicle, said bottom plate including a curved cover portion located at an apex between said forward and rearward downwardly slanting faces for covering said cross-member.

7. The two-wheeled motor vehicle according to claim 1, wherein each of said forward and rearward downwardly slanting faces includes a central portion thereof curved in a transverse direction of the two-wheeled motor vehicle to conform to a transverse shape of the rear wheel of the two-wheeled motor vehicle.

8. The two-wheeled motor vehicle according to claim 7, wherein said vehicle body includes a cross-member extending in a transverse direction of the two-wheeled motor vehicle, said bottom plate including a curved cover portion located at an apex between said forward and rearward downwardly slanting faces for covering said cross-member.

9. The two-wheeled motor vehicle according to claim 1, wherein said vehicle body includes a cross-member extending in a transverse direction of the two-wheeled motor vehicle, said bottom plate including a curved cover portion located at an apex between said forward and rearward downwardly slanting faces for covering said cross-member.

10. The two-wheeled motor vehicle according to claim 1, wherein at least a left and right longitudinal edge portion of each of said forward and rearward downwardly slanting faces is flat in a width direction thereof.

11. A container box for a two-wheeled motor vehicle, said container box being extendable longitudinally of a vehicle body and disposable above a rear wheel and below a seat of the two-wheeled motor vehicle, said container box comprising:

a bottom plate, an entire width of said bottom plate including a forward downwardly slanting face and a rearward downwardly slanting face, said forward and rearward downwardly slanting faces forming an approximately inverse-V shape when viewed from a side, and wherein said forward and rearward downwardly slanting faces are capable of receiving helmets thereon, respectively.

12. The container box according to claim 11, wherein each of said forward and rearward downwardly slanting faces is flat across the entire width thereof.

13. The container box according to claim 11, wherein each of said forward and rearward downwardly slanting faces includes a central portion thereof curved in a longitudinal direction of the two-wheeled motor vehicle to conform to a longitudinal shape of the rear wheel of the two-wheeled motor vehicle.

14. The container box according to claim 13, wherein each of said forward and rearward downwardly slanting faces includes a central portion thereof curved in a transverse direction of the two-wheeled motor vehicle to conform to a transverse shape of the rear wheel of the two-wheeled motor vehicle.

15. The container box according to claim 14, wherein the vehicle body includes a cross-member extending in a transverse direction of the two-wheeled motor vehicle, said bottom plate including a curved cover portion located at an apex between said forward and rearward downwardly slanting faces for covering said cross-member.

16. The container box according to claim 13, wherein the vehicle body includes a cross-member extending in a transverse direction of the two-wheeled motor vehicle, said bottom plate including a curved cover portion located at an apex between said forward and rearward downwardly slanting faces for covering said cross-member.

17. The container box according to claim 11, wherein each of said forward and rearward downwardly slanting faces includes a central portion thereof curved in a transverse direction of the two-wheeled motor vehicle to conform to a transverse shape of the rear wheel of the two-wheeled motor vehicle.

18. The container box according to claim 17, wherein the vehicle body includes a cross-member extending in a transverse direction of the two-wheeled motor vehicle, said bottom plate including a curved cover portion located at an apex between said forward and rearward downwardly slanting faces for covering said cross-member.

19. The container box according to claim 13, wherein the vehicle body includes a cross-member extending in a transverse direction of the two-wheeled motor vehicle, said bottom plate including a curved cover portion located at an apex between said forward and rearward downwardly slanting faces for covering said cross-member.

20. The container box according to claim 11, wherein at least a left and right longitudinal edge portion of each of said forward and rearward downwardly slanting faces is flat in a width direction thereof.

* * * * *